United States Patent
Hiscock et al.

(10) Patent No.: US 6,195,349 B1
(45) Date of Patent: Feb. 27, 2001

(54) SCALABLE LOGICAL LAN

(75) Inventors: James Scott Hiscock, Rockport; Joris Johannes Maria Wils, Acton, both of MA (US); Michael John Seaman, Mountain View, CA (US); Edward A. Heiner, Jr., Londonderry, NH (US); G. Stodel Friedman, Acton; John Joseph Harrison, Jr., North Grafton, both of MA (US)

(73) Assignee: 3COM Corporation, Santa Clara, CA (US)

( * ) Notice: Subject to any disclaimer, the term of this patent is extended or adjusted under 35 U.S.C. 154(b) by 0 days.

(21) Appl. No.: 09/014,547

(22) Filed: Jan. 28, 1998

(51) Int. Cl.[7] .............................. H04L 12/50; H04L 1/00
(52) U.S. Cl. ......................... 370/360; 370/255; 370/400
(58) Field of Search ................................. 370/360, 355, 370/356, 254, 255, 400, 401, 402, 252, 253, 466, 467, 409, 397, 399, 465, 431, 433, 437, 256, 392, 389, 396, 398, 406; 709/238, 239, 224

(56) References Cited

U.S. PATENT DOCUMENTS

| | | | |
|---|---|---|---|
| 5,825,772 | * | 10/1998 | Dobbins et al. .................. 370/401 |
| 5,949,788 | * | 9/1999 | Friedman et al. ................. 370/431 |
| 5,959,968 | * | 9/1999 | Chin et al. ....................... 370/400 |
| 5,959,989 | * | 9/1999 | Gleeson et al. ................... 370/401 |
| 6,016,310 | * | 1/2000 | Muller et al. .................... 370/401 |
| 6,032,194 | * | 2/2000 | Gai et al. ........................ 370/351 |
| 6,035,105 | * | 3/2000 | McCloghrie et al. ............. 370/402 |
| 6,041,057 | * | 3/2000 | Stone ............................. 370/255 |
| 6,049,528 | * | 4/2000 | Hendel et al. ................... 370/437 |

* cited by examiner

Primary Examiner—Wellington Chin
Assistant Examiner—Steven Nguyen
(74) Attorney, Agent, or Firm—McGlew and Tuttle, P.C.

(57) ABSTRACT

A packet based high speed mesh forms a trunk cluster. The trunk cluster is constructed with a set of loosely coupled switches, a configuration protocol, trunked network interfaces, and optionally a reachablilty protocol. The trunk cluster provides a Logical LAN service. Each switch in the trunk cluster provides a single "shared LAN" by interconnecting two or more links. The edge devices attached to the links run a trunk configuration protocol. These attached edge devices view the trunked ports as if trunked ports are connected to a shared LAN with multiple other attached devices.

10 Claims, 4 Drawing Sheets

SCALABLE LOGICAL LAN

BACKGROUND OF THE INVENTION

The invention relates generally to network systems such as Local Area Network (LAN) systems and more particularly to techniques and device models to provide high availability interfaces, and systems.

It has been generally known in the network systems field how to provide redundant capabilities. Redundant packet forwarding devices are especially useful to handle the possibility of failed links and/or failed packet forwarding devices (e.g. switches, routers, bridges). However, the detection of network topology loops and the utilization of redundant paths is problematic, particularly in view of the time involved in detecting the path and rerouting traffic. Further, protocols which have been used are complicated to configure and manage.

Traditionally the spanning tree protocol has been use to provide both Layer 1 and 2 redundancy, in switch networks, by configuring alternate paths. When a link or switch element fails, a backup link is activated. The spanning tree algorithm defines the active and backup links in the topology. Spanning tree is designed to control the many switches of the topology and has a slow (in the tens of seconds) reconfiguration time.

Spanning tree has a significant disadvantage as to the reconfiguration time. As network systems become more complex and handle additional traffic, the reconfiguration time becomes increasingly problematic. Further, spanning tree disables the redundant path. This negates the possibility of using redundant paths for increases in throughput.

FIELD OF THE INVENTION

The invention relates generally to network systems such as Local Area Network (LAN) systems and more particularly to techniques and device models to provide high availability interfaces, and systems.

SUMMARY AND OBJECTS OF THE INVENTION

It is an object of the invention to provide network layer one and layer two redundancy in switch network systems which avoid the use of spanning tree by the use of multiple switches forming a trunk cluster switch which provides additional switch throughput for each additional switch provided in the switch cluster.

According to the invention a packet based high speed mesh is provided which is refereed to herein as a trunk cluster. The trunk cluster cooperates with edge devices to provide a scaleable logical LAN. The trunk cluster is constructed with a set of loosely coupled switches, a configuration protocol, trunked network interfaces, and optionally a reachablilty protocol.

Each switch in the trunk cluster provides a single "shared LAN" by interconnecting two or more links. The edge devices attached to the links run a trunk configuration protocol. These attached edge devices view each physical link within a trunked port as if the attached device is connected to a shared logical LAN with multiple other attached devices.

A logical LAN is designed to provide scaleability and resilience. The set of devices (and devices, switches etc.) that interconnect to a logical LAN, called edge devices, cooperate using configuration protocols and traffic steering methods required to connect to the logical LAN.

The trunk cluster is comprised of two or more trunk switches. A single logical LAN is provided by the edge devices splitting the traffic (directing traffic flow) across the links in a trunk port. Each trunk switch provides a separate path within the trunk cluster (multiple parallel paths are provided). The two or more separate paths between edge devices allow the logical LAN to increase bandwidth by adding more trunk switches and automatically decrease bandwidth in the event of a link failure and/or in the event of a trunk switch failure.

As each trunk switch only carries part of the traffic between edge devices, each trunk switch does not need to and must not participate in any topology control or discovery protocol. Spanning tree, TCMP (Trunk Cluster Management Protocol), IGMP (Internet Group Management Protocol), and GARP (Generic Attribute Registration Protocol) packets are flooded. Unicast MAC (Media Access Controller) source addresses are learned and used to intelligently forward/filter unicast packets to minimize flooding within the "shared LAN" and increase throughput. The maximum throughput of the trunk cluster increases with each additional trunk switch.

Each MAC device of an edge device transmits an hello signal to MAC devices of other edge devices. The hello signal includes a trunk or edge device ID identifying the respective edge device of the MAC device transmitting the hello signal. Each MAC device records the edge device ID's of said hello signals received from other edge devices. These recorded edge device ID's are formed into an hello list for each MAC device. The TCMP agent of an edge device forms a trunk list for each other edge device. Each trunk list for a particular other edge device includes MAC addresses of the present edge device which received the hello signals from the respective one of the other edge devices. For example, if edge device A had three MAC devices which received hello signals from edge device B, edge device A would have a trunk list for edge device B which contained those three MAC devices. When edge device A received traffic for edge device B, edge device A would divide the traffic among the three MAC devices in the trunk list for edge device B. This dividing of traffic received by edge device A for edge device B, is according to the standard trunking convention. In this way, trunking can be accomplished through a plurality of switches in a mesh instead of just over a plurality of links where all the links start and stop at the same nodes. Also the trunking of the present invention allows links to be active and increase data rates, where previously those links would have been inactive due a redundancy decision by a spanning tree algorithm.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
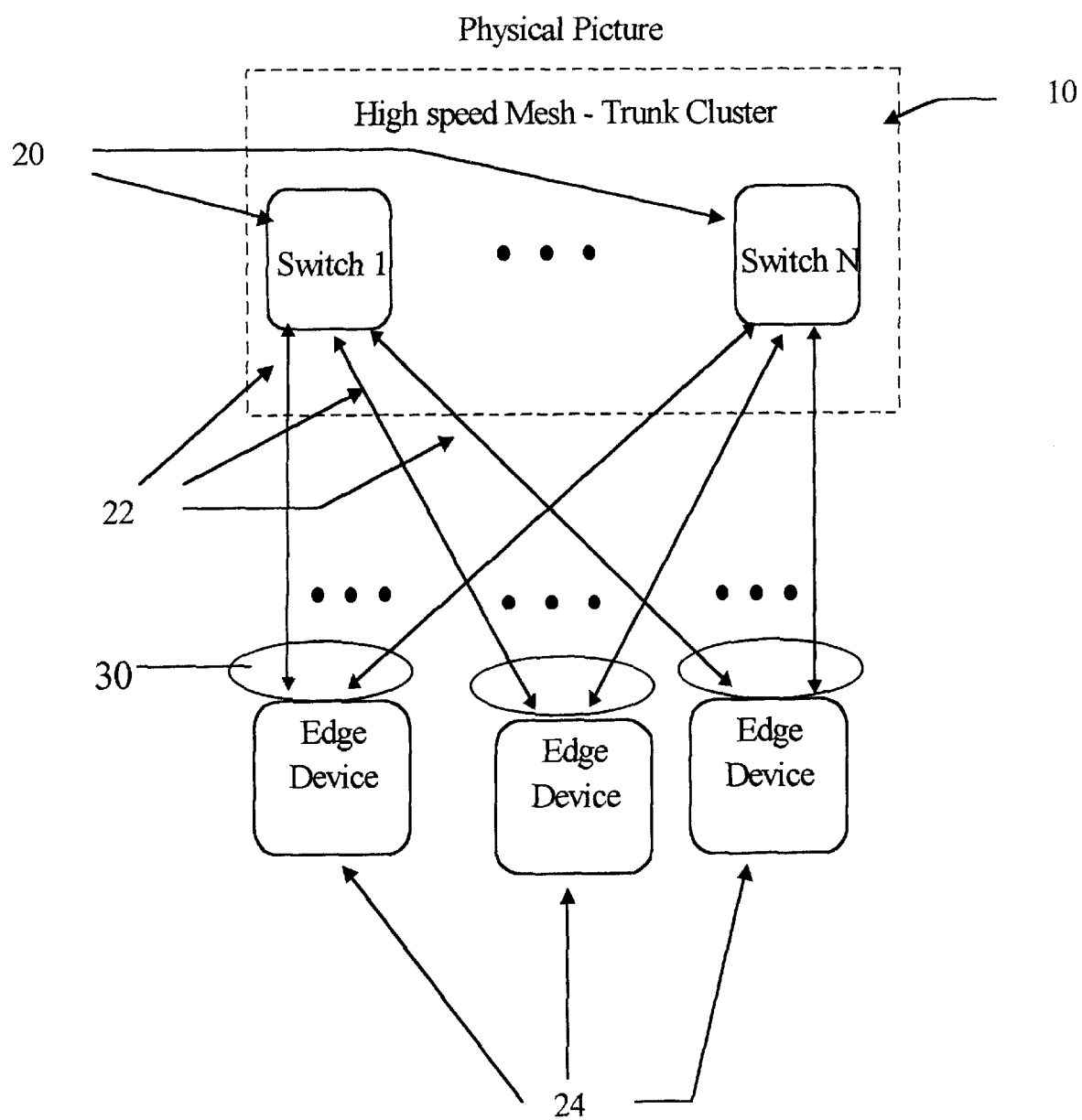
FIG. 1 is a schematic diagram showing the general scheme of the trunk cluster simple redundant switch set according to the invention.

Referring to the drawings in particular, the invention comprises a packet based high speed mesh 10 which is referred to herein as a trunk cluster. The trunk cluster 10 includes a plurality of switches 20 or switches A through N. The trunk cluster is constructed of loosely coupled switches 20 based on a configuration protocol, trunked network interfaces, and optionally a reachablilty protocol.

As shown in FIG. 1, each switch 20, in a trunk cluster 10, provides a single "shared LAN" by interconnecting two or more links 22. Edge devices 24 are attached to the trunks cluster via links 22 running a trunk configuration. A plurality of links comprise a trunk port.

Figure 2:
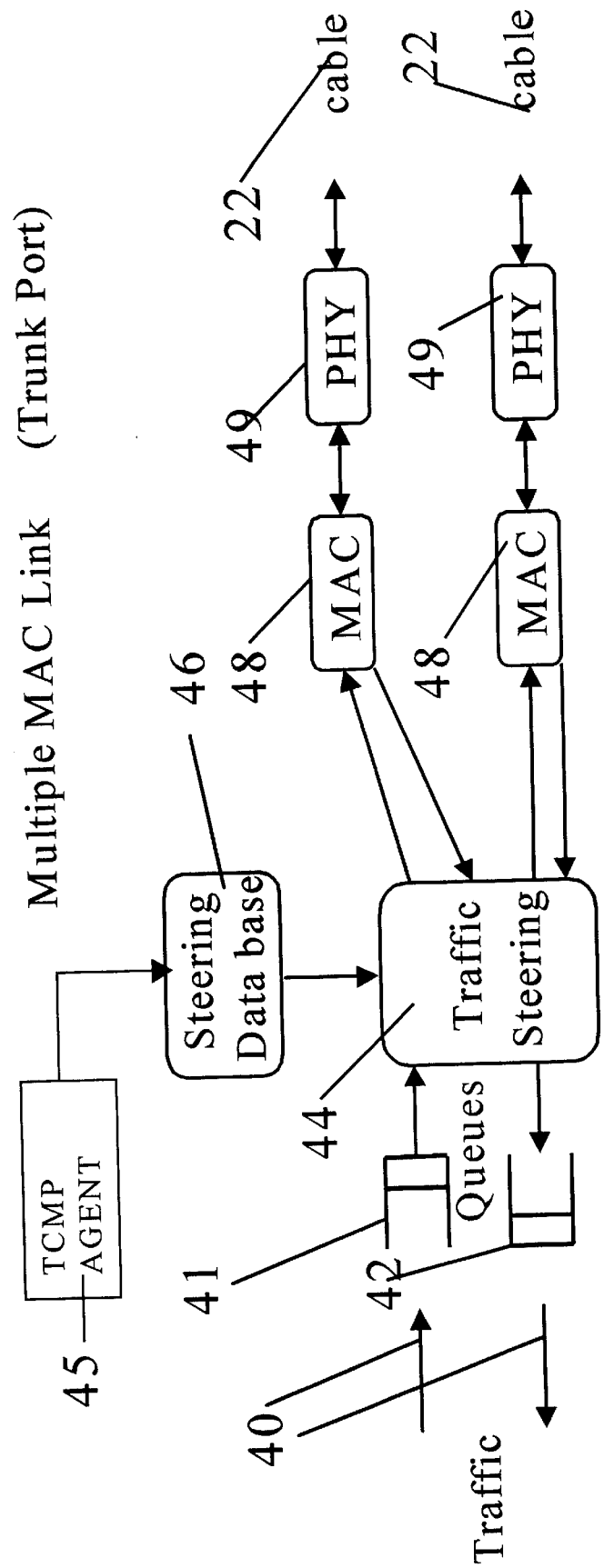
FIG. 2 is a diagram showing traffic flow through a multiple link trunked port.

FIG. 2 illustrates the traffic flow 40 through a multiple link trunked port such as multiple link trunked port 30. FIG. 2 shows transmit queue 41, receive queue 42, traffic steering means 44, steering data base 46, media access controllers (MACs) 48, physical layers 49 and connected cable (link 22). The trunked port 30 acts as a single port, but utilizes multiple physical links 22. The traffic steering means is the logic that knows which MAC 48 to use when transmitting a packet. The traffic steering means 44 dequeues transmit packets, examines the packet, consults the steering data base 46 and transfers the packet to the appropriate MAC 48. The steering data base 46 is constructed by information obtained by the reachability protocol or trunk configuration management protocol (TCMP).

Figure 3:
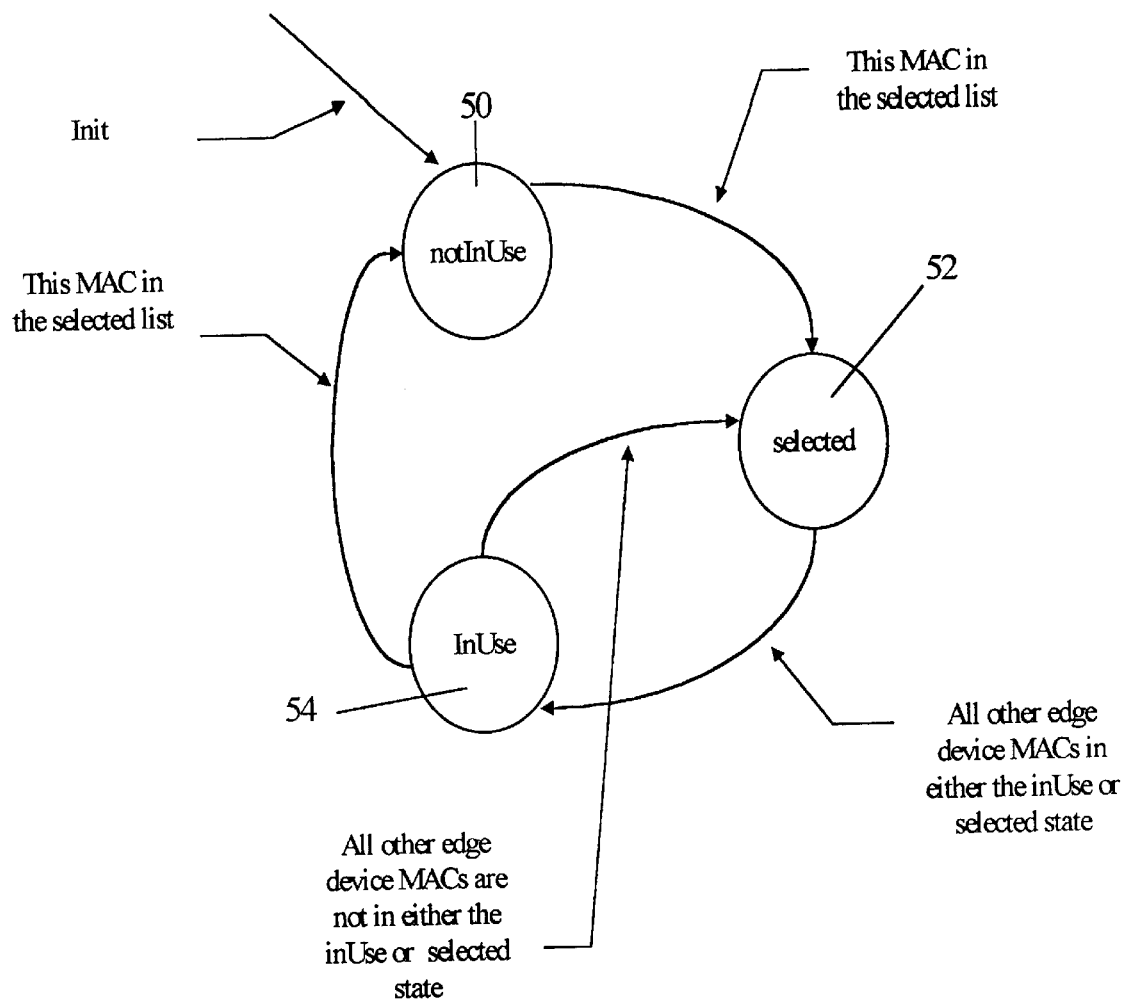
FIG. 3 is a state diagram showing the state of the media access controllers connected to the trunk cluster.

FIG. 3 shows a state diagram of the MACs 48. From the perspective of trunking, a constituent MAC 48 can be in one of the following states.

not in use. A MAC 48 in the not in use state 50 has not been selected for active participation in the trunk. A MAC 48 in this state 50 should neither transmit nor receive LLC (Logical Link Control protocol-defined in IEEE 802.2) frames. This should be the initial state for all MACs 48 of a trunk. A trunk MAC 48 should remain in this state indefinitely, if the underlying network link 22 is down. If TCMP is enabled for a particular trunk, then the MAC 48 may remain in this state 50, even if the underlying network link is up, if TCMP determines that configuration errors preclude its active participation in the trunk.

selected. A MAC 48 in the selected state 52 has been selected for active participation in the trunk, but it has not yet made the transition into active use. A MAC 48 in this state 52 should neither transmit nor receive LLC frames. A MAC 48 in this state is eligible to make a transition to the in use state 54 as soon as TCMP confirms that all other MACs 48 connected to the same network have also been selected. If TCMP is not enabled for a trunk, then no MAC 48 for that trunk should ever enter this state.

in use. A MAC 48 in the in use state 54 is in active use on the trunk. A MAC 48 in this state may transmit and receive LLC frames. If a trunk is manually configured (the connections are manually assigned), then a MAC 48 will transition to this state as soon as the underlying network link is up. If TCMP is enabled (for control and configuration), on the other hand, then a MAC 48 will make a transition to the in use state as soon as it confirms that all other MACs 48 connected to the same network have also been selected.

There is a separate instance of TCMP (a TCMP-agent) for each individual trunk. Initially every MAC 48 starts in the not in use state. Every TCMP "hello time", a TCMP-agent (a software based means 45 writing to the traffic steering means 44) transmits a TCMP "hello message" on every MAC 48. The hello message contains the sender's TCMP node trunk or edge device ID which uniquely identifies the instance of a trunk on a particular node. The hello message also contains the trunking MAC 48 state of the transmitting MAC 48. The hello message is transmitted to a special TCMP multicast address.

The TCMP-agent maintains a current and previous learned node trunk list (steering data base 46) for every MAC 48. Whenever the TCMP-agent receives an TCMP hello message, it adds the node trunk ID to the current list for that MAC 48. If more node trunk IDs are learned than the maximum allowable, then a list overflow indicator is set. The learned node trunk list and list overflow are set to null initially and after TCMP reselection processing.

Every TCMP reselection time, the TCMP-agent performs reselection processing. The goal of reselection is to select the set of MACs 48 which are eligible to go in use. The TCMP-agent accomplishes this by identifying the current learned node trunk list which is common to the greatest number of MACs 48 using the following steps:

1. The TCMP-agent first rejects any list which is null or overflowed.

2. The TCMP-agent also rejects any list which contains a received node trunk ID which is identical to the receiving trunk's node trunk ID (since this indicates that there are two MACs 48 on the same trunk which connect to the same network).

3. From the remaining set of lists, the TCMP-agent selects the list(s) which is common to the greatest number of MACs 48. This biases selection towards activating the widest pipe (path-the activated links/switches) possible. If there is no tie, then a list is selected. Otherwise the process continues.

4. If multiple lists are common to the same number of MACs 48, then the TCMP-agent selects the list(s) which is longest. For equal bandwidth pipes, this biases selection towards connecting the greatest number of nodes. If there is no tie, then a list is selected. Otherwise the process continues.

5. If multiple lists are common to the same number of MACs 48 and they connect the same number of nodes, then the TCMP-agent selects the list containing the numerically smallest non-intersecting node trunk ID. For example given two lists of node trunk IDs, 3-4-6-7 and 3-4-5-8, the second list wins, because 5 is the lowest non-intersecting ID. There cannot be a tie resulting from this step.

Once the TCMP-agent has selected a learned node trunk list, it forces MAC 48 state changes based on the selection. (If no list has been selected, then the TCMP-agent force all MACs 48 into the not in use state). The TCMP-agent forces all MACs 48 whose current learned node trunk list differs from the selected learned node trunk list into the not in use state. The agent forces all MACs 48 with identical lists and not already in the in use state into the selected state. It allows MACs 48 with identical lists that are already in use to remain in use.

Following this reselection process, the TCMP-agent will copy each MAC's current learned node trunk list to its previous list and then reset each current list. This allows the reselection process to be performed completely anew each period. Note that the previous list is used during quick recovery from network link outages.

The final step of MAC 48 activation/deactivation involves further MAC 48 state transitions based upon feedback received via the MAC 48 state field of subsequent hello messages.

The TCMP-agent effects a MAC 48 state transition from selected to in use once that MAC 48 has received a hello message from every previously learned node trunk indicating a MAC 48 state of either selected or in use. As long as the most recently received hello message from any of the learned node trunks remains not in use, then the TCMP-agent does not allow the MAC 48 to go in use. This feedback loop ensures that all of the MACs 48 on the same network have concurring reselection processes. Note that a lack of concurrence might be caused by conditions such as a stuck transmitter or various sorts of configuration errors.

The TCMP-agent also uses the feedback presented by the MAC 48 state field to effect MAC 48 state transitions from in use back to selected. This occurs when an in use MAC 48 receives a hello message from any previously learned node trunk indicating a MAC 48 state of not in use.

The TCMP-agent should ignore the MAC 48 state field in any hello messages received from any node trunks which were not previously learned. The TCMP-agent should defer processing of such new node trunks until the next reselection process.

Figure 4:
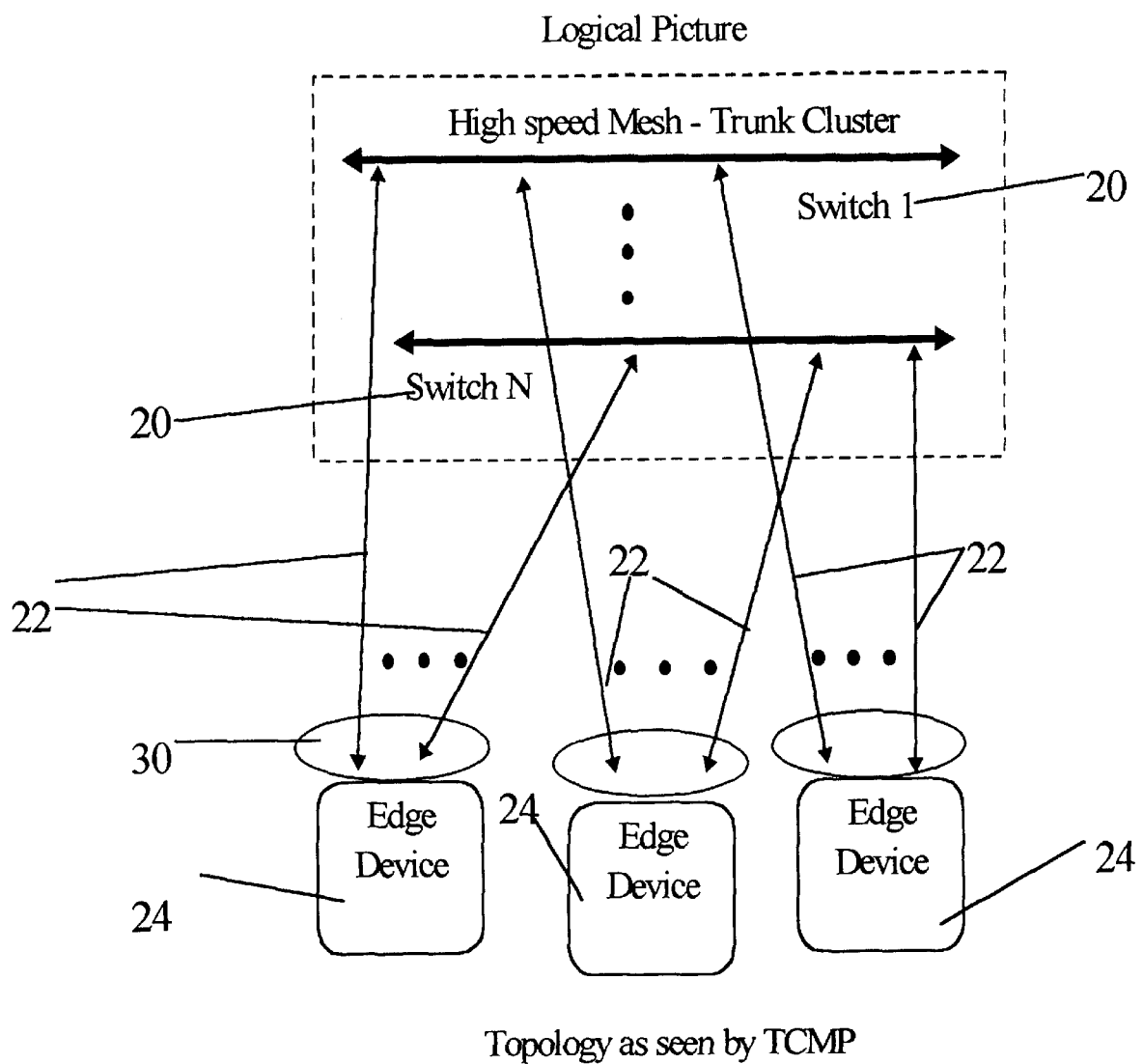
FIG. 4 is a view similar to FIG. 1 showing the logical topology as seen by the edge devices.

FIG. 4 provides the view of the trunked ports of the edge devices (e.g. end device or switches) 24 as seen by the trunk configuration management protocol (TCMP). Each edge device 24 is connected to the other edge devices 24 by multiple paths (link 22 and trunk switch 20). Each trunk switch 20 only provides one "shared LAN" path such that it carries only a part of the traffic between edge devices 24. Each trunk switch 20 does not need to and must not participate in any topology control or discovery protocol. Spanning tree, TCMP, IGMP, and GARP packets are flooded.

Although each switch 20 does not participate in any topology control or discovery protocol Unicast MAC 48 source addresses are learned and used to intelligently forward/filter unicast packets. This is desirable to minimize flooding within the "shared LAN" and increase throughput. The maximum throughput of the trunk cluster increases with each additional switch.

As shown in FIG. 1, the edge devices 24 connect to a trunk cluster via trunked links 22. Basic trunking and trunking enhanced with station reachability are both contemplated.

Basic trunking may be provided which requires at least one physical connection to each switch (A through N) 20 in the trunk cluster 10. This referred to as equal reachability. With equal reachability, the destination address is associated with all links 22 of the trunked ports 30. This prevents any single link attachments to the trunk cluster. If a link is lost, leaving no remaining links to that switch, then trunk configuration protocol will eliminate links connected to that switch. Effectively removing that switch from trunk cluster. Basic trunking uses an "all or none" selection of MACs 48 in a Trunk group. This scheme denies use of a switch 20 in a trunk cluster 10 for all edge devices 24 if a single edge device 24 loses its last link to that switch. This maintains equal reachability for all stations or edge devices 24 over the links 22 in a trunk group.

An enhanced trunking scheme may also be used. The enhanced trunking scheme determines if reachability is equal across all links in the trunk group. If reachability is unequal then the station addresses that have unequal reachability are discovered, packets destined to stations with equal reachability are steered to the transmit link using basic trunking, and packets destined to stations with unequal reachability are steered using a different method. This different method could range from static link assignment, with one destination address assigned to one physical port, to a partial trunking group, wherein one destination address can be assigned to a subset of the links 22. In the case of a two link trunk group, all stations with unequal reachability will have a static assignment to the only link they are reachable by. To implement this enhanced trunking, changes must be made to the TCMP and to the traffic steering method, and a station address distribution protocol is required.

Station unicast MAC 48 addresses (for the switches A-N 22) that are reachable via an edge device 22 can be discovered by one of the methods described below.

The GURP application (GARP Unicast Registration Protocol) utilizes the GARP protocol (IEEE 802.1,q,p) (GARP Unicast Registration Protocol) and distributes the reachability of unicast MAC 48 addresses via an edge device. This protocol would only need to run when the trunk configuration management protocol discovers unequal reachability (unequal unempty trunk ID lists) on its trunked links 22. The GURP messages are sent on all the links in a trunk group. The edge devices 24 note which MAC 48 addresses (for the switches A-N 22) are not reachable on all the links 22 in a trunk cluster 10. The MAC 48 addresses that have unequal reachability are then steered by a mechanism different than the basic trunking across all the links in a trunk group. If this trunk group contains two links then the MAC 48 addresses that have unequal reachability are assigned to the only link they are reachable.

Another scheme is TCARP (Trunk Cluster ARP). With this scheme MAC 48 address reachability is discovered when needed. As with the GURP scheme above all MAC 48 addresses (for the switches A-N 22) are known to be equally reachable if the trunk configuration management protocol does not discover unequal unempty trunk ID lists on its trunked links. If the edge device 24 is an endsystem, the reachability of an address is determined when the end system 24 wants to send a packet to that MAC 48 address. If the edge device 24 is a switch, the reachability of an address is determined when a MAC 48 address is learnt and entered in the forwarding database.

The reachability of a MAC 48 address is determined by sending a query on all the links in the trunk group. The edge device that provides connectivity to that MAC 48 address replies on the link the query was received. If the replies are not heard on all the links in the Trunk group the address is determined to have unequal reachability.

The MAC 48 address is assigned to one of the links which is reachable. This assigned scheme can vary from static link assignment to a sub-trunking group.

While specific embodiments of the invention have been shown and described in detail to illustrate the application of the principles of the invention, it will be understood that the invention may be embodied otherwise without departing from such principles.

What is claimed is:

1. A logical LAN system, comprising:
   a plurality of switches grouped together to form a scalable logical LAN;
   edge devices comprising one of an end system and a switch; trunk links;
   trunk links;
   MAC devices at each of said edge devices, each edge device being connected to each of said switches by a separate one of said links and by a MAC device; and
   a trunk cluster management agent associated with each respective edge device for forming a trunk list for each other edge device connected by a MAC device and associated line and dividing traffic received for one of said other edge devices among said MAC devices.

2. The logical LAN according to claim 1, wherein said trunk cluster management agent manages the activity of each MAC of each edge device.

3. The logical LAN according to claim 1, wherein said trunked links provide a link connected from each edge device to each switch and a trunked network interface provided for each of said edge devices.

4. The logical LAN according to claim 1, wherein said trunk cluster management agent implements a reachablilty protocol for determining the reachablilty of each switch of said plurality of switches.

5. The logical LAN according to claim 2, wherein said trunk wherein said trunk cluster management agent implements a configuration management protocol eliminating links connected to a switch with a non functioning link or a non functioning switch.

6. The logical LAN according to claim 1, wherein said trunk links provide one physical connection to each switch of said plurality of switches.

7. The logical LAN according to claim 1, wherein said trunk cluster management agent implements a reachability protocol for determining the paths, including a link and attached switch of said plurality of switches, reachable by each edge device.

8. The logical LAN according to claim 1, wherein said trunk cluster management agent implements a management protocol managing MAC device activity and providing data for use by a reachability protocol to provide basic trunking wherein all paths are reachable by each edge device and enhanced trunking wherein one or more links are unequally reachable by said edge devices.

9. A method of trunking a plurality of mesh switches, the method comprising the steps of:

provinding a plurality of edge devices, each of said edge devices being connected to a set of said mesh switches by a separate link and MAC device, each of said edge devices including a trunk cluster management protocol (TCMP) agent;

each of said MAC devices transmitting a Hello signal to MAC devices of other said edge devices, said Hello signal including an edge device ID identifying a respective edge device of said MAC device;

each said MAC device recording edge device ID's of said Hello signals received from other said edge devices;

said TCMP agent of said respective edge device forming a trunk list for each other edge device, each said trunk list including all MAC devices of a respective edge device which received said Hello signals from one of said other edge devices;

each said TCMP agent dividing traffic received for one of said other edge devices among said MAC devices of said trunk list for said one of said other edge devices, said dividing being according to a trunking convention.

10. A logical LAN system, comprising:

a plurality of switches grouped together to form a scalable logical LAN;

edge devices comprising one of an end system and a switch; trunk links;

MAC devices at each of said edge devices, each edge device being connected to each of said switches by a separate one of said links and by a MAC device; and a trunk cluster management agent associated with each respective edge device for forming a trunk list for each other edge device connected by a MAC device and associated line and dividing traffic received for one of said other edge devices among said MAC devices wherein said trunk cluster management agent implements a management protocol managing MAC device activity and extracting information and exposing data for use by a reachability protocol to provide basic trunking wherein all paths are reachable by each edge device and enhanced trunking wherein one or more links are discovered to be unequally reachable by said edge devices.

* * * * *

UNITED STATES PATENT AND TRADEMARK OFFICE
CERTIFICATE OF CORRECTION

PATENT NO. : 6,195,349 B1
DATED : February 27, 2001
INVENTOR(S) : Hiscock et al.

It is certified that error appears in the above-identified patent and that said Letters Patent is hereby corrected as shown below:

<u>Column 6, lines 57-67 and Column 7, lines 1-3,</u>
-- 1. A logical LAN system, comprising:
    a plurality of switches grouped together to form
    a scalable logical LAN; edge devices comprising
    one of an end system and a switch; trunk links;
    MAC devices at each of said edge devices, each edge
    device being connected to each of said switches by a
    separate one of said links and by a MAC device; and
    a trunk cluster management agent associated with each
    respective edge device for forming a trunk list for
    each other edge device connected by a MAC device and
    associated line and dividing traffic received for one
    of said other edge devices among said MAC devices. --

Signed and Sealed this

Third Day of September, 2002

*Attest:*

*Attesting Officer*

JAMES E. ROGAN
*Director of the United States Patent and Trademark Office*